United States Patent
Litvinov et al.

(10) Patent No.: US 6,560,069 B1
(45) Date of Patent: May 6, 2003

(54) PERPENDICULAR RECORDING HEAD DEFINING THE TRACKWIDTH BY MATERIAL DEPOSITION THICKNESS

(75) Inventors: Dmitri Litvinov, Pittsburgh, PA (US); Sakhrat Khizroev, Pittsburgh, PA (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/726,157

(22) Filed: Nov. 29, 2000

Related U.S. Application Data

(60) Provisional application No. 60/167,936, filed on Nov. 29, 1999, and provisional application No. 60/167,952, filed on Nov. 29, 1999.

(51) Int. Cl.⁷ .............................................. G11B 5/147
(52) U.S. Cl. ........................................................ 360/126
(58) Field of Search ................................ 360/126, 125, 360/110

(56) References Cited

U.S. PATENT DOCUMENTS

| | | | |
|---|---|---|---|
| 2,927,163 A | 3/1960 | Brower | 360/123 |
| 3,805,291 A | 4/1974 | Sakurai | 360/120 |
| 3,813,766 A | 6/1974 | Brock et al. | 29/603.18 |
| 4,001,890 A | 1/1977 | Kayser | 360/121 |
| 4,078,300 A | 3/1978 | Lazzari | 29/603.15 |
| 4,138,702 A | 2/1979 | Magnenet | 360/125 |
| 4,219,855 A | 8/1980 | Jones, Jr. | 360/234.7 |
| 4,404,609 A | 9/1983 | Jones, Jr. | 360/126 |
| 4,423,450 A | 12/1983 | Hamilton | 360/111 |
| 4,438,471 A | 3/1984 | Oshiki et al. | 360/125 |
| 4,441,131 A | 4/1984 | Osanai | 360/119 |
| 4,541,026 A | 9/1985 | Bonin et al. | 360/121 |
| 4,546,398 A | 10/1985 | Toda et al. | 360/126 |
| 4,575,777 A | 3/1986 | Hosokawa | 360/123 |
| 4,613,918 A | 9/1986 | Kanai et al. | 360/320 |
| 4,631,612 A | 12/1986 | Shiiki et al. | 360/125 |
| 4,639,810 A | 1/1987 | Sakai | 360/125 |
| 4,649,449 A | 3/1987 | Sawada et al. | 360/123 |
| 4,652,956 A | 3/1987 | Schewe | 360/123 |
| 4,672,494 A | 6/1987 | Furuya et al. | 360/125 |
| 4,703,382 A | 10/1987 | Schewe et al. | 360/125 |

(List continued on next page.)

FOREIGN PATENT DOCUMENTS

| | | |
|---|---|---|
| GB | 1344890 | 1/1974 |
| JP | 59231720 | 12/1884 |
| JP | 56087218 | 7/1981 |
| JP | 59195311 | 11/1984 |
| JP | 2001-148107 A * | 5/2001 |

OTHER PUBLICATIONS

U.S. patent application No. 09/695,679, Khizroev et al., filed Oct. 24, 2000.
U.S. patent application No. 09/809,118, Crue et al., Mar. 15, 2001.

Primary Examiner—A. J. Heinz
Assistant Examiner—Julie Anne Watko
(74) Attorney, Agent, or Firm—Alan G. Towner, Esq.; Pietragallo, Bosick & Gordon

(57) ABSTRACT

A perpendicular recording head for use with magnetic recording medium has an improved structure permitting an unusually narrow trackwidth to be defined by a simple, cost-efficient manufacturing process. The main pole and opposing pole of the recording head are deposited on the side of the slider, so that the trackwidth is controlled by the thickness of material deposited to form the main pole. The dimension of the main pole along the direction of the track is not critical for permitting a recording head of the present invention to record at high densities. The opposing pole may be located in front of, to the side of, or behind the main pole.

10 Claims, 5 Drawing Sheets

U.S. PATENT DOCUMENTS

| | | | |
|---|---|---|---|
| 4,742,413 A | 5/1988 | Schewe | 360/126 |
| 4,763,215 A | 8/1988 | Gueugnon et al. | 360/119 |
| 4,839,761 A | 6/1989 | Gatzen | 360/234.7 |
| 4,860,139 A | 8/1989 | Hamilton | 360/126 |
| 4,873,599 A | 10/1989 | Sueoka | 360/126 |
| 4,943,882 A | 7/1990 | Wada et al. | 360/126 |
| 4,974,110 A | 11/1990 | Kanamine et al. | 360/126 |
| 5,016,342 A | 5/1991 | Pisharody et al. | 29/603.15 |
| 5,027,246 A * | 6/1991 | Numazawa et al. | 360/126 |
| 5,068,959 A | 12/1991 | Sidman | 29/603.08 |
| 5,073,836 A | 12/1991 | Gill et al. | 360/317 |
| 5,196,976 A | 3/1993 | Lazzari | 360/318.1 |
| 5,225,953 A | 7/1993 | Wada et al. | 360/126 |
| 5,305,516 A | 4/1994 | Imazeki et al. | 29/603.16 |
| 5,372,698 A | 12/1994 | Liao | 205/90 |
| 5,606,478 A | 2/1997 | Chen et al. | 360/126 |
| 5,687,046 A * | 11/1997 | Mathews | 360/125 |
| 5,738,927 A | 4/1998 | Nakamura et al. | 428/141 |
| 5,812,350 A | 9/1998 | Chen et al. | 360/126 |
| 5,864,450 A | 1/1999 | Chen et al. | 360/319 |
| 5,920,979 A | 7/1999 | Nepela et al. | 29/603.13 |
| 5,942,342 A | 8/1999 | Hikosaka et al. | 428/694 R |
| 5,995,341 A * | 11/1999 | Tanaka et al. | 360/122 |
| 2001/0022712 A1 | 9/2001 | Funayama et al. | 360/317 |
| 2001/0027603 A1 | 10/2001 | Komuro et al. | 29/603.14 |

* cited by examiner

PERPENDICULAR RECORDING HEAD DEFINING THE TRACKWIDTH BY MATERIAL DEPOSITION THICKNESS

CROSS-REFERENCE TO RELATED APPLICATIONS

This application claims the benefit of U.S. Provisional Patent Application No. 60/167,936 and No. 60/167,952, both filed Nov. 29, 1999.

BACKGROUND OF THE INVENTION

1. Field of the Invention

This application relates to perpendicular recording heads for use with magnetic recording media. More specifically, the invention relates to a perpendicular recording head wherein the layers of material comprising the recording head's components are deposited perpendicular to the recording medium's direction of travel.

2. Description of the Related Art

Perpendicular recording heads for use with magnetic recording media have been proposed to overcome the storage density limitations of longitudinal recording heads. Perpendicular recording heads typically include a pair of magnetically coupled poles, with the main pole having a significantly smaller surface area than the opposing pole. A coil is located adjacent to the main pole for inducing a magnetic field in the main pole. Magnetic recording media used with perpendicular recording heads typically includes an upper layer having alternating magnetically hard tracks and nonmagnetized transitions. A magnetically soft lower layer will typically be located adjacent to the recording layer, opposite the recording head. Due to the difference in surface area between the main pole and opposing pole, and the magnetic flux passing through the soft underlayer between the two poles, the orientation of magnetic flux within the recording tracks will be oriented perpendicular to the recording medium, and parallel to the magnetic flux within the main pole.

The recording density is inversely proportional to the width of the magnetically hard recording tracks. The width of these tracks is a function of the width of the recording heads main pole. Presently available main poles are currently produced through lithographic processes. The width of the main pole is therefore limited by the resolution of these lithographic processes.

Therefore, there is a need for an improved perpendicular recording head having a main pole with a narrow width. Further, there is a need for a perpendicular recording head having a main pole capable of being produced by processes having better resolution than lithography. Additionally, there is a need for a method of manufacturing a perpendicular recording head capable of producing main poles for use with narrow trackwidths.

SUMMARY OF THE INVENTION

The present invention is a perpendicular recording head for use with magnetic recording media. Although not limited to such use, such a recording head is particularly useful for fixed or hard drives for computers.

A perpendicular recording head of the present invention includes a main pole magnetically coupled to an opposing pole. The bottom surface of the opposing pole has a significantly greater surface area than the bottom surface of the main pole. An electrically conductive coil passes adjacent to the main pole for inducing magnetic flux within the main pole. The direction of magnetic flux within the main pole may be reversed by reversing the direction of current flow through the coil.

A preferred and suggested method of making a perpendicular recording head of the present invention involves depositing the material to form the main pole and opposing pole on the side of a slider. The material is thereby deposited perpendicular to the recording medium's direction of travel, and parallel to the recording medium's trackwidth. Therefore, the trackwidth is a function of the amount of material deposited on the side of the slider to form the main pole. The increased area of the opposing pole relative to the main pole may be achieved by depositing the opposing pole over a longer portion of the slider, or by depositing a thicker layer of material to form the opposing pole.

Alternatively, the perpendicular recording head may be manufactured by first depositing the opposing pole on the side of the slider, followed by depositing a magnetically permeable joint between the main and opposing poles, a coil, and lastly, a main pole. As before, the trackwidth is defined by the thickness of material deposited to form the main pole. The opposing pole may be given a greater bottom surface area than the main pole by either increasing the length of the slider on which the opposing pole is deposited, or by increasing the thickness of material deposited to form the opposing pole.

A typical magnetic recording medium for use in conjunction with a perpendicular recording head includes an upper layer having a plurality of magnetically permeable tracks separated by nonmagnetized transitions, and a magnetically permeable lower level. The lower level is magnetically soft relative to the tracks.

The recording head is separated from the magnetic recording medium by a distance known as the flying height. The magnetic recording medium is moved past the recording head so that the recording head follows the tracks of the magnetic recording medium, with the main pole oriented parallel to the tracks and perpendicular to the trackwidth. Current is passed through the coil to create magnetic flux within the main pole. The magnetic flux will pass from the main pole through the track, into the lower layer, and across to the opposite pole. The flux will thereby cause the magnetic fields in the tracks to align with the magnetic flux of the main pole. Changing the direction of electric current changes the direction of the flux created by the recording head and therefore the magnetic fields within the magnetic recording medium. Because the surface area of the opposing pole is significantly greater than the surface area of the main pole, the magnetic flux density passing through the opposing pole will be significantly lower than the magnetic flux density passing through the main pole. Therefore, only the magnetic flux immediately adjacent to the bottom surface of the main pole will affect the orientation of the magnetic fields within the tracks. A binary "zero" is recorded by maintaining a constant direction of magnetic flux through the main pole, and a binary "one" is recorded by changing the direction of magnetic flux through the main pole.

When writing to a magnetic recording medium, the rate of decrease of magnetic field strength with increasing distance from the trailing edge of the main pole determines the recording density possible within a given track. This decrease in magnetic field strength determines the ability of the main pole to effect the orientation of magnetic flux within that portion of the track directly below the main pole, without effecting the orientation of magnetic flux in the track sector immediately behind the sector for which a write operation is being performed. Therefore, the dimension of the main pole parallel to the track does not effect recording density, and is only critical for ensuring that the surface area of the main pole's bottom is significantly less than the area of the opposing pole's bottom surface. Because the only critical dimension of the main pole is controlled by the thickness of material deposited to form the main pole, the method of producing such a perpendicular recording head is particularly simple and efficient. Additionally, because magnetic flux immediately adjacent to the opposing pole's bottom surface is not sufficiently strong to effect the orientation of magnetic flux within the magnetic recording medium, the position of the opposing pole relative to the main pole is limited only by the need to maintain a flow of magnetic flux between the main and opposing poles of the perpendicular recording head, and the soft underlayer of the magnetic recording medium. The opposing pole may therefore be located in front of, to the side of, or behind the main pole.

It is therefore an aspect of the present invention to provide a perpendicular recording head for use with magnetic recording media having a narrower main pole than can be produced by presently used lithography methods.

It is another aspect of the present invention to provide a perpendicular recording head wherein the width of the main pole is determined by the process of depositing the material forming the main pole to the appropriate thickness.

It is a further aspect of the present invention to provide a perpendicular recording head wherein the width of the main pole is the only critical dimension for maximizing recording density.

It is another aspect of the present invention to provide a perpendicular recording head wherein the main pole and opposing pole are deposited directly onto a side of a slider.

It is a further aspect of the present invention to provide a perpendicular recording head wherein changing the direction of current through the coil causes the orientation of magnetic flux within the opposing pole's end joint between the opposing poles to rotate from one orientation, through its default orientation, and to the opposing orientation, instead of flipping from one orientation to the other.

It is a further aspect of the present invention to provide a method of manufacturing a perpendicular recording head that is simpler and less expensive than presently used manufacturing methods.

These and other aspects of the present invention will become more apparent through the following description and drawings.

BRIEF DESCRIPTION OF THE DRAWINGS

Like reference numbers denote like elements throughout the drawings.

DETAILED DESCRIPTION OF THE PREFERRED EMBODIMENTS

The preferred embodiments of the present invention are perpendicular recording heads for use with magnetic recording media. As will be explained in detail below, the trackwidth of the recording media used with these recording heads is defined by the thickness of the material deposited to form the main pole. Perpendicular recording head main poles typically have thickness measured in a direction parallel to the tracks of the magnetic recording media, and a width defined perpendicular to the tracks of the magnetic recording medium. Deposited materials typically have a thickness measured from the surface of the substrate to the surface of the deposited material. Therefore, the width of the main pole corresponds to the thickness of the desired material. As used herein, recording head is defined as a head adapted for read and/or write operations, although the present invention is specifically directed towards the write portion of the recording head.

Figure 1:
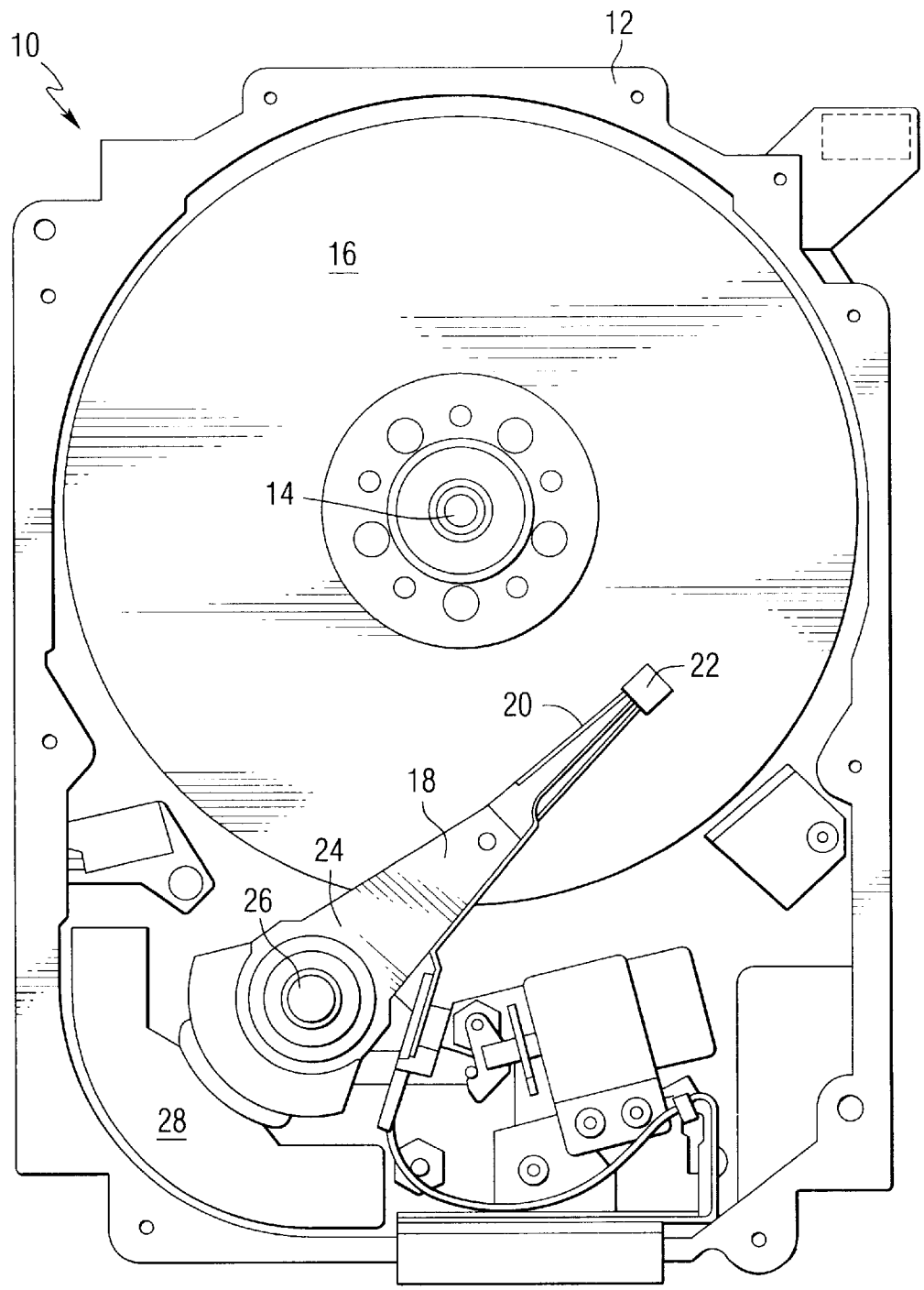
FIG. 1 is a top view of a typical hard disc drive for a computer for which the present invention may be used, illustrating the disc drive with its upper housing portion removed.

The invention will most commonly be used within a fixed disc drive 10 for computers, one of which is illustrated in FIG. 1. The fixed disc drive 10 includes a housing 12 (with the upper portion removed and the lower portion visible in this view for maximum clarity) dimensioned and configured to contain and locate the various components of the disc drive 10. The disc drive 10 includes a spindle motor 14 for rotating at least one magnetic storage medium 16 within the housing, in this case a magnetic disc. At least one arm 18 is contained within the housing 12, with each arm 18 having a first end 20 with a perpendicular recording head or slider 22, and a second end 24 pivotally mounted to a bearing 26. An actuator motor 28, such as a movable coil DC motor, is located at the arm's second end 24, pivoting the arm 18 to position the head 22 over a desired sector of the disc 16. The actuator motor 28 is regulated by controller which is not shown and which is well known.

Figure 2:
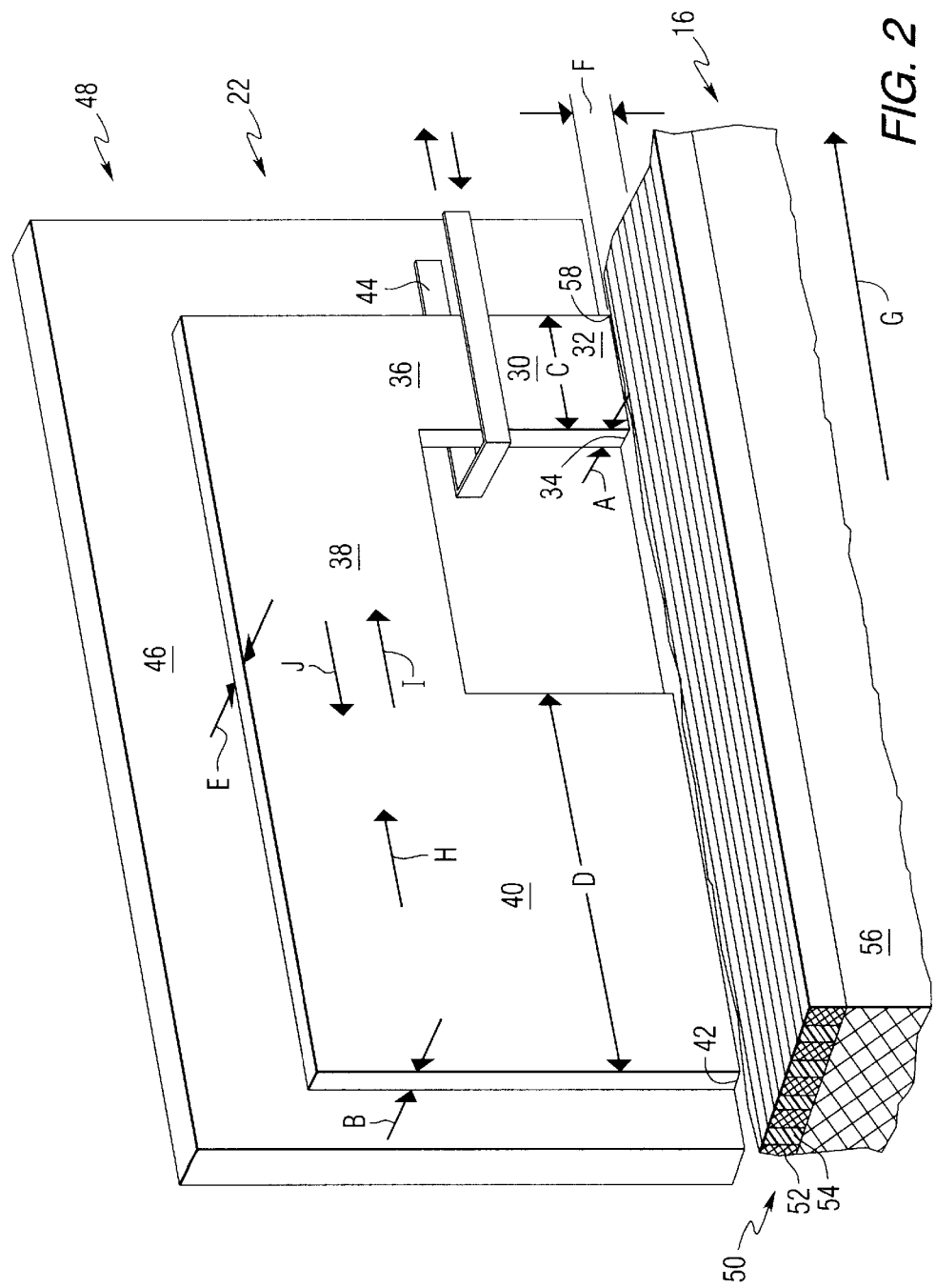
FIG. 2 is a partially sectioned, partially schematic, perspective view of an embodiment of a perpendicular recording head according to the present invention.
Figure 3:
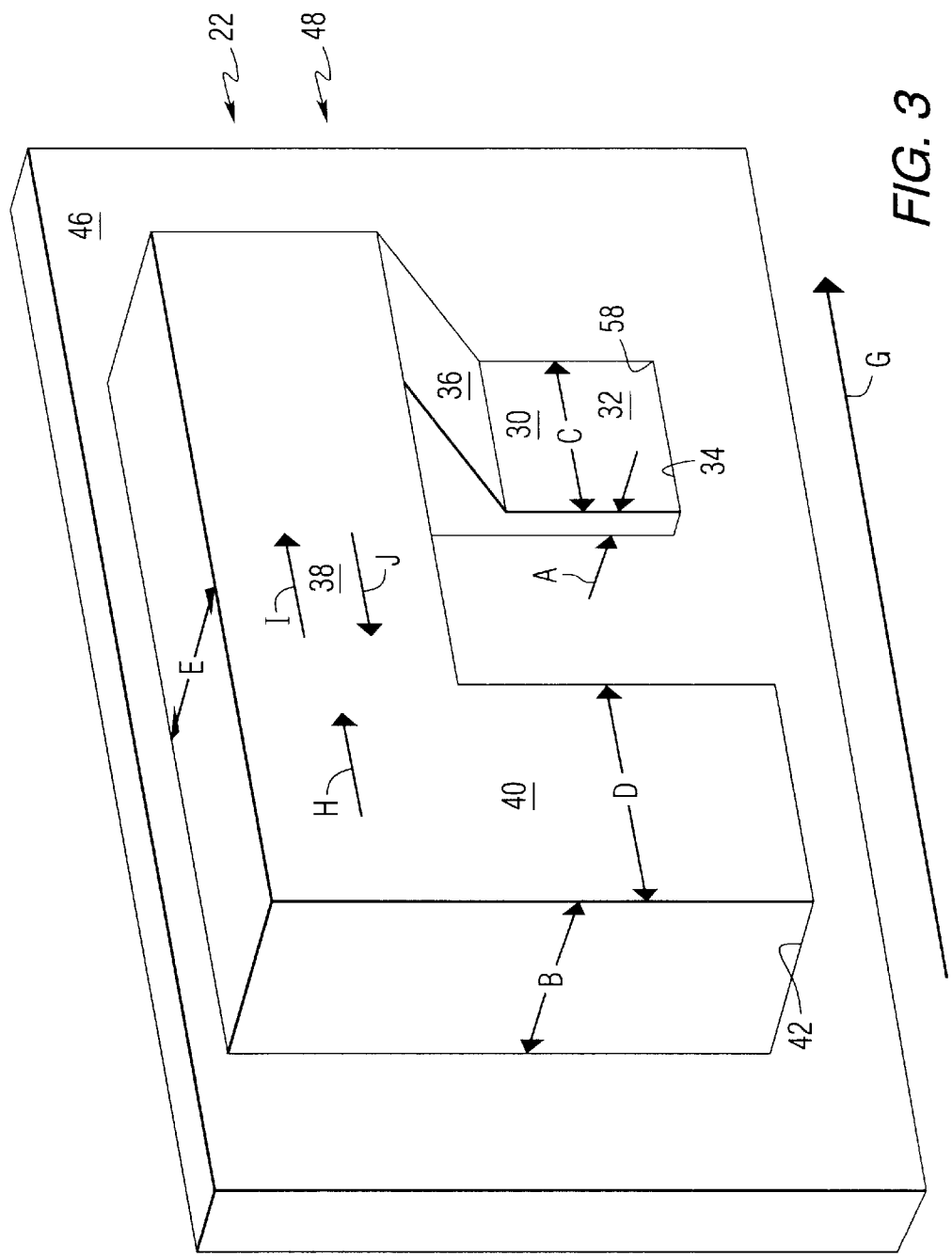
FIG. 3 is a partially schematic, perspective view of another embodiment of a perpendicular recording head according to the present invention.
Figure 4:
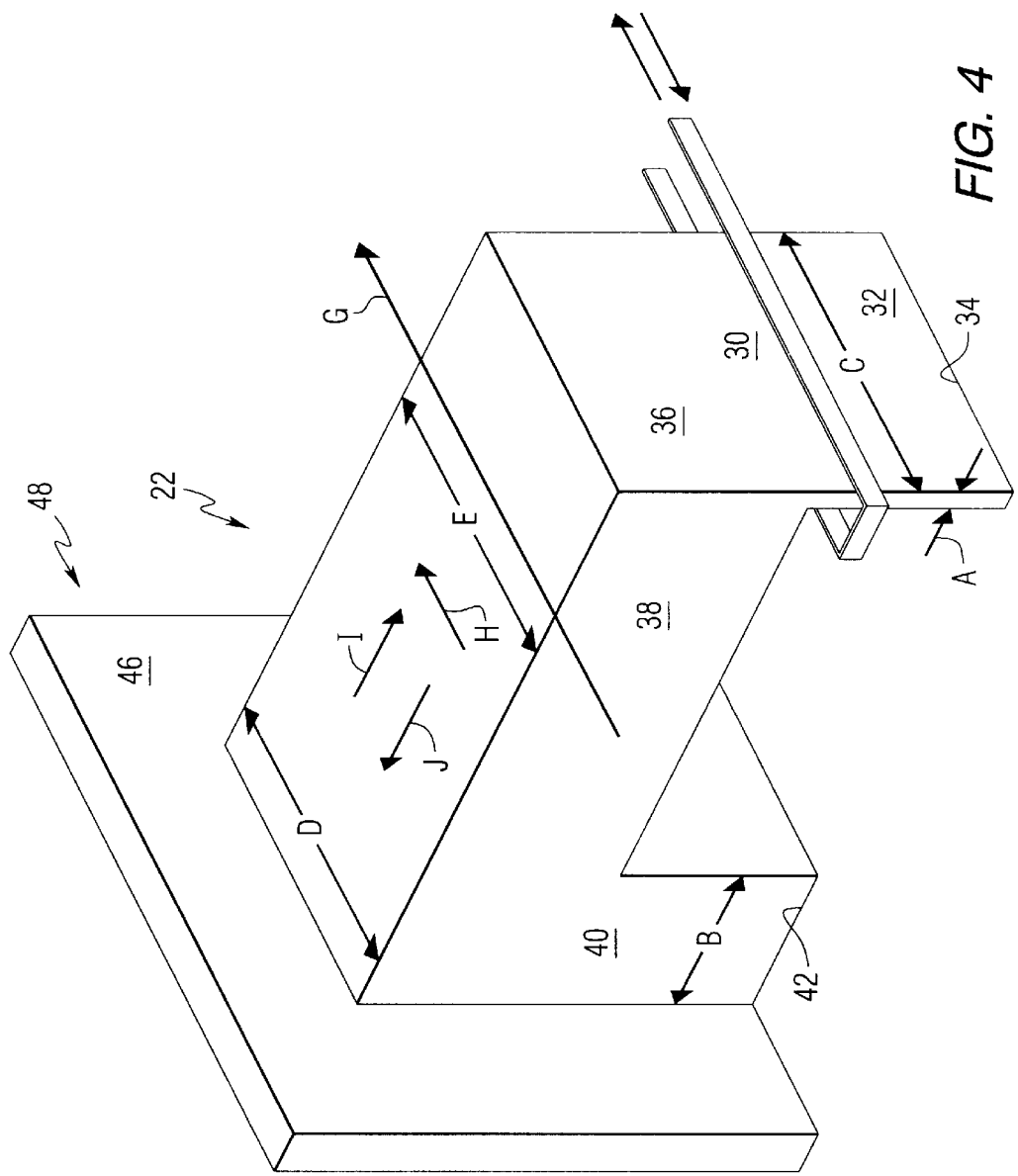
FIG. 4 is a partially schematic, perspective view of an alternative embodiment of a perpendicular recording head of the present invention.

The features of the write portion of a perpendicular recording head 22 and corresponding magnetic storage disc 16 are best illustrated in FIGS. 2–4. The perpendicular recording head 22 includes means for concentrating magnetic flux onto a small surface area of magnetic recording medium, here a magnetically permeable main pole 30, oriented substantially perpendicular to the magnetic recording medium 16, and having a tip 32. The tip 32 includes a bottom surface 34. The top 36 of the main pole 30 is preferably magnetically coupled to a joint 38. An opposing pole 40 is also magnetically coupled to the joint 38, opposite the main pole 30. The opposing pole 40 includes a bottom surface 42, having a surface area significantly larger than the surface are of the bottom surface 34 of the main pole 30. An electrically conductive coil 44 is located adjacent to the main pole 30, and is dimensioned and configured to induce a magnetic flux in the main pole 30. The main pole 30 and opposing pole 40 of the present invention are secured to the side 46 of a slider 48 within the head 22. The slider 48 is well-known in the art of hard or fixed disks to be that portion of the perpendicular recording head 22 being dimensioned and configured to utilize airflow created by the rotating disk 16 to maintain a flying height A above the surface of the disk 16. For purposes of this description, the side 46 of the slider 48 is defined as any surface on a slider 48 substantially parallel to the direction of travel of the magnetic recording medium 16. A side 46 may therefore include a surface located between other layers of the perpendicular recording head 22, or any substrate that may be secured between the slider 48 and the poles 30,40.

One preferred embodiment of the recording head 22 is illustrated in FIG. 2. This embodiment of the recording head 22 includes a main pole 30 and opposing pole 40 which are both deposited directly on the side 46 of the substrate 48. In this embodiment, the thickness A of the main pole 30 may be substantially equal to the thickness B of the opposing pole 40. The surface area of the bottom 42 of opposing pole 40 is made larger than the surface area of the bottom 34 of the main pole 30 by making the opposing pole's length D significantly greater than the main pole's length C.

An alternative preferred embodiment is illustrated in FIG. 3. Like the embodiment of FIG. 2, this perpendicular recording head 22 is also made by plating both the main pole 30 and opposing pole 40 directly on the side 46 of the slider 48. However, the thickness B of the opposing pole 40 and the thickness E of the joint 38 are both significantly larger than the thickness A of the main pole 30. This difference in thickness is accomplished by merely depositing additional material to form the joint 38 and/or opposing pole 40.

A second alternative preferred embodiment of the perpendicular recording head 22 is illustrated in FIG. 4. This embodiment of the recording head 22 is made by first depositing the opposing pole 40 onto the side 46 of slider 48. Next, the joint 38 is deposited onto the opposing pole 40. Lastly, the main pole 30 is deposited onto the joint 38. Within this embodiment, the length D of the opposing pole 40 and length C of the main pole 30 may be substantially identical. The surface area of the bottom surface 42 of opposing pole 40 is preferably made larger than the surface area of the bottom surface 34 of the main pole 30 by making the opposing pole's thickness B significantly larger than the main pole's thickness A. Although this embodiment is illustrated with the opposing pole 40 directly secured to the side 46, a perpendicular recording head of this embodiment could easily be reversed. Explained differently, the main pole 30 may be directly deposited on the side 46, with the joint 38 deposited on the main pole 30, followed by depositing opposing pole 40 on the joint 38. As long as a first pole (either the main pole 30 or opposing pole 40) is secured to the side 46, and a second pole (the remaining pole from among main pole 30 and opposing pole 40) is provided, the width A of main pole 30 will be substantially parallel to the width of track 52 (described below).

Referring back to FIG. 2, a magnetic storage medium 16, here a magnetic disc, for use with a perpendicular recording head 22 is illustrated. The disc 16 includes an upper layer 50 having a plurality of magnetically permeable tracks 52, which are divided into sectors, with each sector having several different magnetic fields within the magnetically permeable material (not shown and well understood). The tracks 52 are separated by nonmagnetized transitions 54. The disc 16 also includes a magnetically permeable lower layer 56, which is magnetically soft relative to the tracks 52. In use, the disc 16 will be separated from the tip 32 of the main pole 30 by a flying height F. The flying height F is sufficiently small so that a high concentration of flux from the main pole 30 will pass through the track 52, but sufficiently large to prevent damage to disc 16 from contact with the recording head 22.

Recording is accomplished by rotating the disc 16 relative to the recording head 22 so that the recording head 22 is located above the appropriate sectors of the tracks 52. As recording progresses, the disc 16 will move past the recording head 22 in the direction of the arrow G. Current will be supplied to the coil 44, thereby inducing a magnetic field within the main pole 30. The greatest concentration of flux from this magnetic field will pass from the tip 32 of the main pole 30 through the track 52 directly under the main pole 30 on which recording is being carried out, the lower layer 56, through a different sector of a track 52 directly under the opposing pole 40, through the opposing pole 40 and joint 38, and finally forming a complete loop back through the top 36 of the main pole 30. A a portion of a sector of the track 52 passes under the main pole 30, the orientation of its magnetic field will correspond to the orientation of the magnetic field of the main pole 30, which will be perpendicular to the disc 16. As the main pole passes over the disc 16, the direction of current passing through the coil 44 will remain constant when a binary "0" is being recording, thereby creating consistent orientation of the magnetic field within the track 52. The current passing through the coil 46 will reverse directions when a binary "1" is being recorded, thereby changing the orientation of a magnetic field within the track 52. The opposing pole 40 does not affect the magnetic fields within the upper layer 50 because the large surface area of the bottom surface 42 of the opposing pole 40 relative to the small surface area of the bottom surface 34 of the main pole 30 results in a significantly lower flux concentration through the opposing pole 40 than through the main pole 30.

The recording density possible with a perpendicular recording head is primarily dependent upon the main pole's width A. With a perpendicular recording head 22 of the present invention, the width A corresponds to the thickness of magnetically permeable material deposited to form the main pole 30. Therefore, the width A, and resulting trackwidth of the magnetic recording medium, is controlled by a material deposition process. When presently available perpendicular recording heads are made, the width A is typically controlled by a lithography process. A main pole made by lithography typically cannot be made narrower than 300 nm. By controlling the width A using a material deposition process such as sputtering instead of lithography, the width A can be made significantly narrower.

Figure 5:
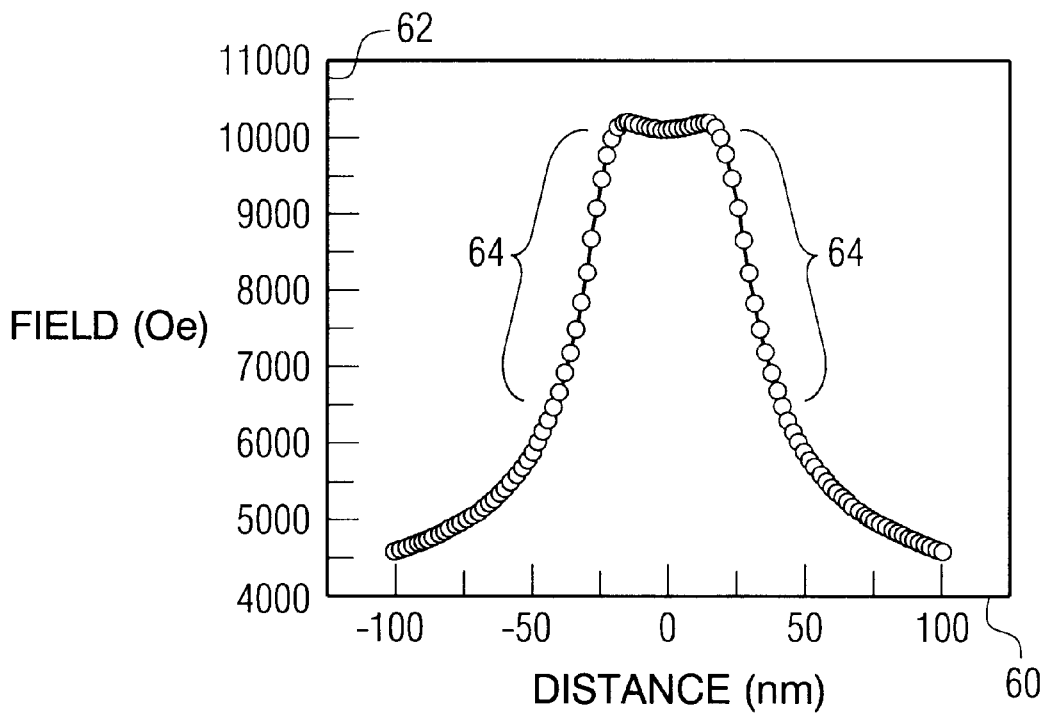
FIG. 5 is a graph representing magnetic field strength as a function of distance from the center of the main pole in the direction parallel to the trackwidth.

FIG. 5 illustrates how a main pole 30 of the present invention permits a narrow trackwidth to be used. FIG. 5 illustrates the magnetic field as a function of distance from the center of the main pole 30 in the direction parallel to the trackwidth. Distance from the center of the main pole 30 in the direction parallel to the trackwidth is shown on the X axis of the graph, as reference number 60. Field strength is illustrated on the Y axis 62. This graph illustrates that a main pole 30 having a width A of 50 nm at a height 30 nm above the lower layer 56 will produce a strong magnetic field within that portion of a sector of a track 52 directly underneath the main pole 30. At the same time, the magnetic field strength drops off rapidly with increasing distance from the main pole 30, preventing the main pole 30 from influencing the magnetic fields within neighboring tracks. This rapid drop off and magnetic field strength is illustrated at reference number 64. For this reason, a main pole 30 of the present invention permits the use of trackwidth significantly narrower than those possible with presently available perpendicular recording heads.

Figure 6:
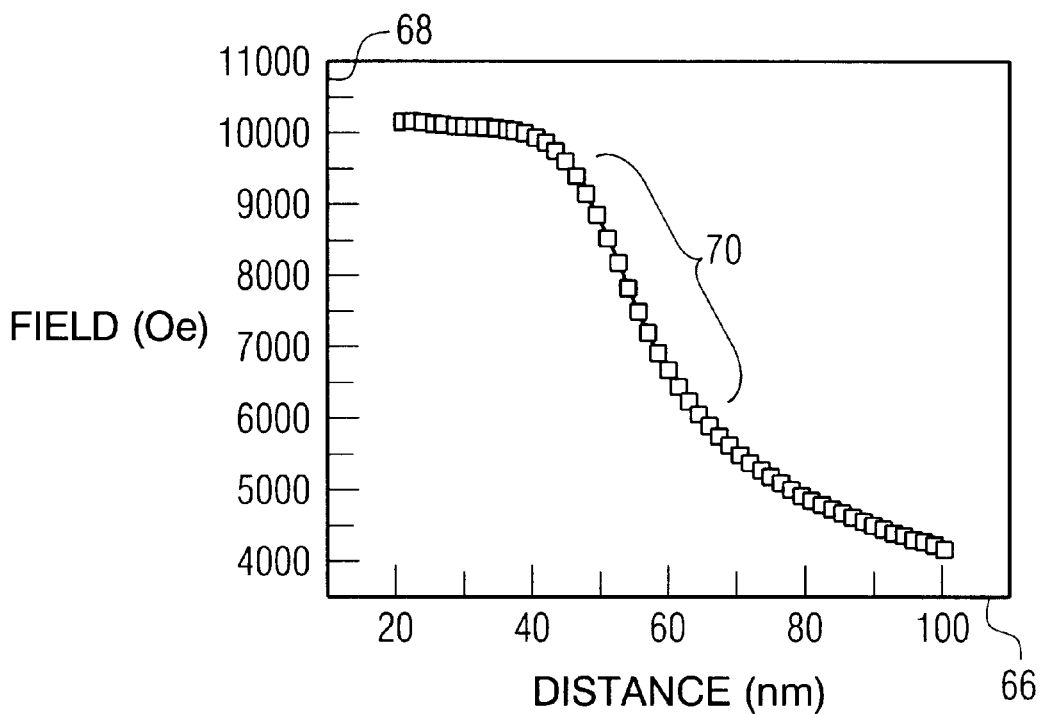
FIG. 6 is a graph indicating magnetic field strength as a function of distance from the trailing end of the main pole in the direction parallel to the tracks.

The length C of the main pole 30 does not have an effect on the recording density permitted by a recording head 22 of the present invention. The main pole 30 works on the principle of "trailing edge" writing. The recording density permitted within any given track is therefore a function of the decrease in magnetic field strength from the main pole 30 with increasing distance along the track from the trailing edge 58 of main pole 30. An increase in the rate of decrease of field strength as a function of distance from the trailing edge 58 permits the sectors within the track 52 to be closer together, without the risk of a write operation performed on one sector affecting the orientation of the magnetic field in the immediately preceding sector. FIG. 6 illustrates magnetic field strength as a function of distance from the trailing edge 58 of main pole 30. Distance from the trailing edge of main pole 30 is indicated on the X axis by reference number 66. Field strength is indicated on the Y axis by reference number 68. Because the orientation of magnetic flux within the main pole 30 as the trailing edge 58 (the last portion of the main pole 30 that the sector will pass underneath) is what will ultimately determine the orientation of magnetic flux within that sector, the rapid decrease in magnetic field strength with increasing distance from the trailing edge 58, as indicated at reference number 70, illustrates that a high recording density within each track 52 can be used.

Referring back to FIGS. 2–4, an additional advantage of the specific embodiment of FIG. 4 is illustrated. The magnetically permeable material forming the main pole 30, joint 38, and opposing pole 40 will typically be given a default magnetic polarization parallel to the magnetic recording medium during manufacture. A typical direction for this default polarization is illustrated by arrow H. When current is applied to the coil 44, magnetic flux within the joint 38 will be oriented in either the direction of arrow I or the direction of arrow J, depending on the direction of current through the coil 44. In the embodiments of the perpendicular recording head illustrated in FIGS. 2 and 3, given the opposing pole 40 and main pole 30 a default magnetic polarization H, parallel to the magnetic recording medium 16 requires that the orientation of the default magnetic polarization H be parallel with one possible flux orientation during write operations, an anti-parallel to the other possible flux orientation during write operations. Therefore, when the direction of current through the coil 44 changes, the orientation of magnetic flux within the joint 38 must "flip" from the orientation of arrow I to the orientation of arrow J, or vise versa. Within the perpendicular recording head of FIG. 4, however, the default magnetic polarization H may be oriented in a direction which is both parallel to the magnetic recording medium 16, and perpendicular to the possible magnetic flux orientations I and J when current flows through the coil 44. Therefore, when the current direction within the coil 44 changes, the orientation of magnetic flux through the joint 38 will not "flip" from the orientation of arrow I to the orientation of arrow J, or vise versa. Instead, the orientation of magnetic flux through the joint 38 will "rotate" from the orientation of arrow I, through the orientation of arrow H, to the orientation of arrow J, or vise versa. This is believed to prevent electromagnetic "noise".

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalence thereof.

What is claimed is:

1. A perpendicular recording head comprising:
    a main pole secured on a side of a slider having a deposition thickness corresponding to a track width of a magnetic recording medium;
    an opposing pole connected to the main pole; and
    means for directing magnetic flux from said main pole into a track of the magnetic recording medium and back to the opposing pole, wherein the magnetic flux from the main pole into the track is sufficient to affect orientation of magnetic fields within the track and the magnetic flux traveling back to the opposing pole is not sufficient to affect orientation of magnetic fields within the track.

2. The perpendicular recording head according to claim 1, wherein said main pole is deposited directly on said side of said slider.

3. The perpendicular recording head according to claim 1, wherein said opposing pole is thicker than said main pole.

4. A perpendicular recording head comprising:
    a slider having at least one side structured and configured for alignment substantially parallel to a direction of travel of a magnetic recording medium; and
    a main pole and an opposing pole secured on said side of said slider structured and configured such that only the main pole affects orientation of magnetic fields within tracks of the magnetic recording medium, wherein the main pole has a width measured in a direction perpendicular to the side of the slider which corresponds to a thickness of magnetically permeable material that has been deposited to form the main pole.

5. The perpendicular recording head according to claim 4, wherein said main pole is deposited directly on said side of said slider.

6. The perpendicular recording head according to claim 5, further comprising an opposing pole deposited directly on said side of said slider.

7. The perpendicular recording head according to claim 5, wherein said opposing pole is thicker than said main pole.

8. The perpendicular recording head according to claim 7, further comprising an opposing pole deposited directly on said side of said slider.

9. The perpendicular recording head according to claim 4, wherein:
    said opposing pole is deposited directly on said slider;
    a magnetically permeable joint is deposited on said main pole; and
    said main pole is deposited on said magnetically permeable joint.

10. A perpendicular recording head comprising:
    a slider having at least one side structured and configured for alignment substantially parallel to a direction of travel of a magnetic recording medium; and
    a main pole and an opposing pole secured oh said side of said slider, wherein the main pole has a width measured in a direction perpendicular to the side of the slider which corresponds to a thickness of magnetically permeable material that has been deposited to form the main pole, and wherein:
    the opposing pole is deposited directly on the slider;
    a magnetically permeable joint is deposited on the main opposing pole; and
    the main pole is deposited on the magnetically permeable joint.

* * * * *

UNITED STATES PATENT AND TRADEMARK OFFICE
CERTIFICATE OF CORRECTION

PATENT NO.    : 6,560,069 B1
DATED         : May 6, 2003
INVENTOR(S)   : Dmitri Litvinov and Sakhrat Khizroev It is certified that error appears in the above-identified patent and that said Letters Patent is hereby corrected as shown below:

Column 4,
Line 57, after "surface", "are" should read -- area --.

Column 6,
Line 12, after "30." "A" should read -- As --.
Line 18, "recording" should read -- recorded --.

Column 8,
Line 55, after "secured", "oh" should read -- on --.
Line 62, after "on the", delete "main".

Signed and Sealed this

Thirteenth Day of December, 2005

JON W. DUDAS
*Director of the United States Patent and Trademark Office*